July 3, 1962 E. D. LIVINGSTON 3,042,374
STEEL AND ALUMINUM PULLEY BLOCK
Filed Sept. 22, 1959
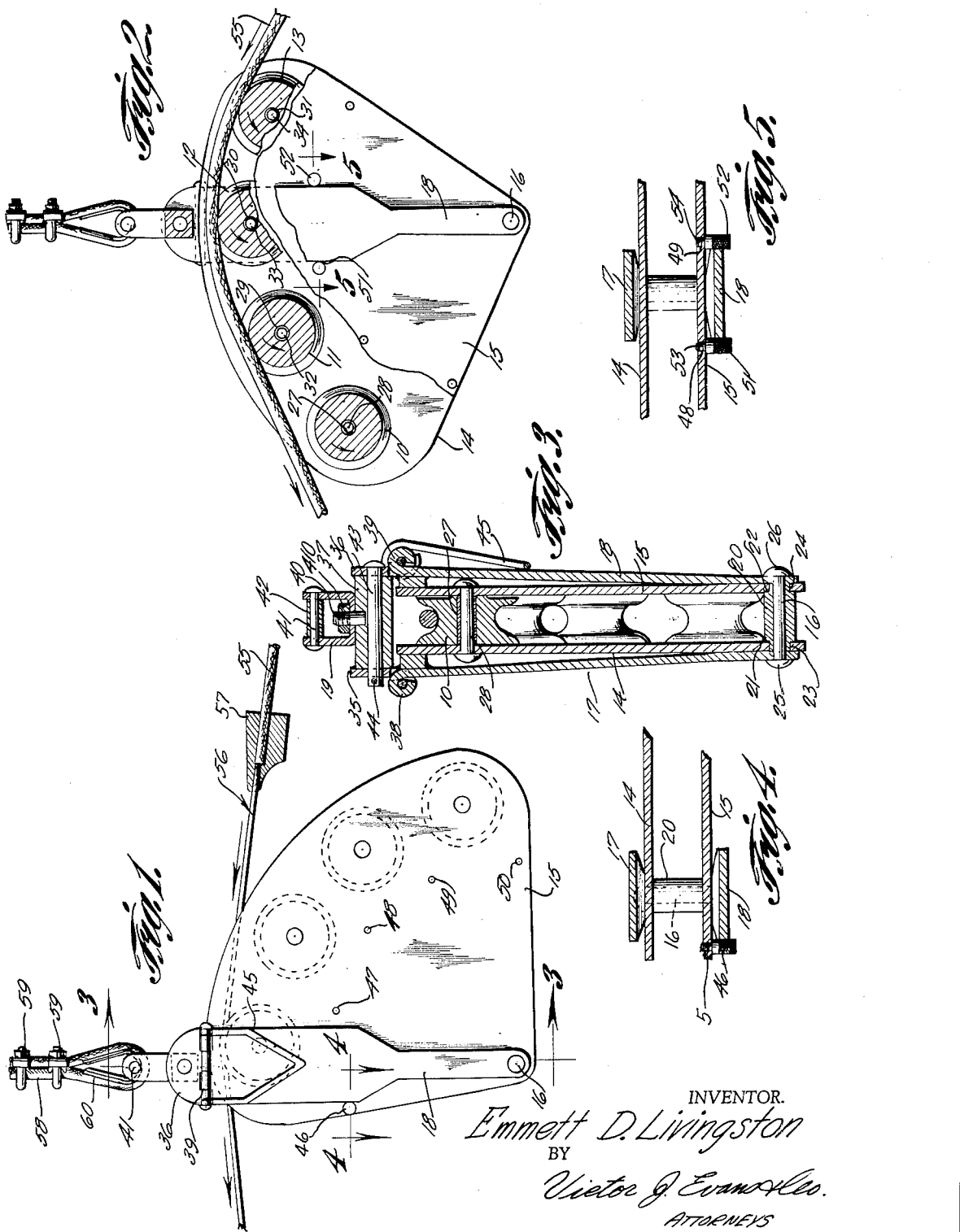
INVENTOR.
Emmett D. Livingston
BY
Victor J. Evans & Co.
ATTORNEYS United States Patent Office 3,042,374
Patented July 3, 1962

3,042,374
STEEL AND ALUMINUM PULLEY BLOCK
Emmett D. Livingston, 5 Division St., Box 333,
Norwich, N.Y.
Filed Sept. 22, 1959, Ser. No. 841,613
2 Claims. (Cl. 254—134.3)

This invention relates to high tension or power transmission lines where a soft metal cable, such as an aluminum cable is attached to a steel cable wherein a steel cable is drawn over a steel pulley until the end of an aluminum cable contacts the steel pulley, at which time a pulley block having steel and aluminum pulleys therein swings over the center dropping the steel pulley and placing aluminum pulleys in position for receiving the aluminum cable.

The purpose of this invention is to provide a relatively simple pulley block in which an aluminum cable, attached to a steel cable, is drawn by a steel cable on a steel pulley of the block until the aluminum cable arrives at the block, at which time the steel pulley drops below the path of the cable and the aluminum cable rests upon aluminum pulleys.

The combination steel and aluminum pulley block of this invention is an improvement over the block of my prior patent, No. 2,879,031, issued March 24, 1950, in that instead of using the combination of levers for dropping the auxiliary pulley a pivotal mounting is provided for the pulley block whereby an aluminum cable drawn into the block by a steel cable is held by a plurality of aluminum pulleys with the steel pulley dropped downwardly out of the path of the cable.

The use of aluminum cables in high tension electric transmission lines is becoming universal and in substantially all instances the aluminum cable is drawn by a steel cable. Due to the fact that aluminum cables are provided with smooth outer surfaces it is not desirable to run the aluminum cables over steel pulleys and, at the same time, owing to the roughness of the steel cables it is not desired to draw the steel cable over the aluminum pulleys upon which the aluminum cable is being trained.

With this thought in mind this invention contemplates a pulley block including a pair of side plates with a steel pulley in combination with a plurality of aluminum pulleys rotatably mounted in the side plates and positioned between said side plates and with suspension bars pivotally mounted in the side plates and extended above upper edges of the plates.

The object of this invention is, therefore, to provide a combination pulley block having steel and aluminum pulleys therein with a steel cable extended from an aluminum cable and with a shoe on a connection between the aluminum and steel cables whereby the shoe actuates the block including the side plates to a position whereby the steel pulley drops downwardly and the aluminum pulleys travel into position for receiving the aluminum cable.

Another object of the invention is to provide a pulley block having steel and aluminum pulleys therein in which the aluminum pulleys are positioned to provide a saddle upon which an aluminum cable is carried.

Another important object of the invention is to provide a pulley block for steel and aluminum cables in which steel and aluminum pulleys are mounted in side plates pivotally supported by arms, the upper ends of which are connected by a clevis to a supporting cable.

A further object of the invention is to provide a pulley block for both steel and aluminum cables in which the block is of a simple and economical construction.

With these and other objects and advantages in view the invention embodies a pulley block including a pair of side plates, supporting arms positioned against outer surfaces of the side plates, means for pivotally mounting the side plates in lower ends of the arms, a cable receiving clevis connecting upper ends of the arms, a steel pulley positioned between the side plates and rotatably mounted therein, and a plurality of aluminum pulleys also positioned between the side plates and rotatably mounted therein, the side plates being pivotally mounted in lower ends of the arms wherein the aluminum pulleys are positioned on a radius from the center of the pivotal mounting of the plates and the arms and the distance from the center of the steel pulley to the pivotal mounting is less than the radius upon which the aluminum pulleys are positioned.

Other features and advantages of the invention will appear from the following description taken in connection with the drawing, wherein:

FIGURE 1 is a side elevational view showing the improved combination pulley block and showing an aluminum cable connected to a steel cable extended through the block.

FIGURE 2 is a side elevational view, similar to that shown in FIGURE 1 with the pulley block rotated until the aluminum pullleys provide a saddle for an aluminum cable extended through the block, the upper part of the side plate and arm on the nearest side of the block broken away.

FIGURE 3 is a cross-section through the combination pulley block taken on line 3—3 of FIGURE 1.

FIGURE 4 is a sectional plan through the block taken on line 4—4 of FIGURE 1 showing a stop for limiting movements of the side plates and pulleys in the supporting arms.

FIGURE 5 is a sectional plan taken on line 5—5 of FIGURE 2 showing stops on the sides of one of the arms of the block for retaining the side plates and pulleys in position for use.

Referring now to the drawing wherein like reference characters denote corresponding parts the improved combination steel and aluminum pulley block of this invention includes a steel pulley 10, aluminum pulleys 11, 12 and 13, side plates 14 and 15 pivotally mounted by a pin or rivet 16 in lower ends of arms 17 and 18, and a clevis 19 for receiving a cable or other supporting element.

The side plates 14 and 15 are pivotally mounted in lower ends of the arms 17 and 18 by the rivet 16 and the rivet 16 extends through a bushing 20 that is provided with shoulders 21 and 22 from which nipples 23 and 24 extend. With the side plates and arms retained against the shoulders 21 and 22 by heads 25 and 26, respectively, of said rivet 16, binding between the parts is substantially eliminated so that the pulleys are free to rotate.

The steel pulley 10 is provided with a sleeve 27 on a pin 28 and with the sleeve 27 longer than the width of the pulley the pulley is free to rotate. Pulleys 11, 12 and 13 are also mounted on similar sleeves 29, 30 and 31 on pins 32, 33 and 34, respectively and these pulleys are also free to rotate.

The upper ends of the arms 17 and 18 are hinged to flanges 35 and 36 by hinges 38 and 39 and the clevis 19 is secured to a hub 37 that is mounted on a pin 43 that extends through the flanges 35 and 36 by a stud 40 having a nut 410 thereon, as shown in FIGURE 3. The clevis 19 which is provided with a sleeve 42 on a pin 41 may be secured to the hub 37 by welding or other means. The flanges 35 and 36 abut ends of the hub 37 and are retained in removable engagement therewith by a pin 43 and the end of the pin may be provided with a cotter-pin 44, or the like.

The hinge 39, at one side of the pulley block is provided with a lever 45, and the side plate 15, at one side of the block is provided with a threaded opening 5 for receiving a stop pin 46 and also similar openings 47, 48, 49 and 50 for receiving pins, such as the pins 51 and 52 which are provided with threaded studs 53 and 54, respectively whereby with the block positioned as shown in FIGURE 2 wherein the aluminum pulleys 11, 12 and 13 form a saddle the threaded studs of the pins 51 and 52 are threaded in the openings 48 and 49 thereby locking the pulley block in the position illustrated in FIGURE 2 in which the aluminum pulley 12 is positioned to receive the load of an aluminum cable 55.

The aluminum cable 55 is secured to the end of a steel cable 56 and the shoe 57 extended around the connection between the steel and aluminum cables is positioned to engage the steel pulley 10 as the steel cable 56 is drawn through the pulley block swinging the block about the axis of the rivet 16 whereby the block moves from the position shown in FIGURE 1 to that shown in FIGURE 2 and wherein the aluminum cable 55 extends over the pulleys 11, 12 and 13.

The arms 17 and 18 are hinged to the flanges 35 and 36 so that with the pin 43 removed the flanges 35 and 36 may swing outwardly to facilitate inserting a cable in the pulley block or to facilitate removing a cable from the pulley block.

As illustrated in FIGURE 1 the pulley block is suspended by a cable 58, the end of which is secured around the sleeve 42 and pin 41 by the U-clamps 59. The loop formed by the clamps is provided with a metal liner 60.

With the parts in operative positions, as illustrated in FIGURES 1, 2, 4, and 5, pins 46, 51, and 52 may be selectively inserted in the openings 5, 47, 48, 49 and 50 to engage the opposite sides of the arms 17 and 18 whereby the pulley block is retained in operative position between the arms 17 and 18.

In use, the side plates and pulleys are positioned as shown in FIGURE 1, whereby a steel cable 56 extended from the end of an aluminum cable 55 is trained over the pulley 10 and upon engagement of a shoe 57, at the end of the aluminum cable, the pulley block swings over from the position shown in FIGURE 1 to that shown in FIGURE 2 whereby the aluminum cable 55 rests directly upon the aluminum pulleys 11, 12 and 13. By this means the highly polished surface of the aluminum cable is not in contact with the steel cable at any point and with the aluminum cable resting upon the aluminum pulley a permanent installation of an aluminum cable is provided. At this time the pins 51 and 52 are inserted into such openings that are positioned on opposite sides of the arms 17 and 18. The pins 51 and 52 will then prevent any further pivotal movement of the pulley block between the arms 17 and 18. Thus the pulley block is permitted full pivotal movement between the arms 17 and 18 until it reaches the correct position such as for example as shown in FIGURE 2, at which time the pins 51 and 52 are engaged with the desired openings in the respective plates to retain the pulley block in operative position.

It will be understood that modifications, within the scope of the appended claims, may be made in the design and arrangement of the parts without departing from the spirit of the invention.

What is claimed is:

1. In a pulley block, the combination which comprises a pair of parallel substantially triangular shaped side plates, each of said side plates having an arcuate base portion and straight side portions extending from the opposite ends of said base portion to converge at their opposite ends at the apex thereof, a steel pulley positioned between said side plates and rotatably mounted therein adjacent the junction of one end of said base portion and one end of one of said side portions, a plurality of aluminum pulleys also positioned between said side plates and rotatably mounted therein in spaced succeeding relation to said steel pulley, said aluminum pulleys being so mounted that their axes follow the curvature of said base, vertically disposed arms positioned adjacent the outer surfaces of said side plates, means mounted in the apex of said side plates for pivotally mounting said side plates between said arms at one end thereof, a flange hingedly connected to the opposite end of each arm, a pin extending through said flanges, a hub mounted on said pin, a cable receiving clevis positioned between said flanges and secured to said hub, said side plates having relatively spaced openings therein positioned adjacent said pulleys in the path of the pivotal movement of said arms and stop pins adapted to be selectively mounted in the openings in said side plates and engaging said arms for limiting the movement of said side plates in relation to said arms.

2. The combination as described in claim 1 wherein an aluminum cable is secured to the end of a steel cable and a shoe is positioned at the intersection of said steel and aluminum cables and said shoe is adapted to engage said steel pulley so that as the steel cable is drawn through the pulley block said shoe will engage said steel pulley and pivot the side plates between said arms so that said steel pulley will drop below the path of said aluminum cable and said aluminum pulleys will be positioned to provide a saddle for supporting said aluminum cable as it is drawn through said side plates.

References Cited in the file of this patent

UNITED STATES PATENTS

| | | |
|---|---|---|
| 279,985 | Sharrett | June 26, 1883 |
| 1,828,897 | Hollingsworth | Oct. 27, 1931 |
| 2,174,429 | Taylor | Sept. 26, 1939 |
| 2,879,031 | Livingston | Mar. 24, 1959 |

FOREIGN PATENTS

| | | |
|---|---|---|
| 1,104,834 | France | June 22, 1955 |